United States Patent [19]
Oakes

[11] Patent Number: 5,208,828
[45] Date of Patent: May 4, 1993

[54] PRODUCTION OF TRANSITION JOINTS BETWEEN FERRITIC STEEL COMPONENTS

[75] Inventor: Graham Oakes, Sheffield, England

[73] Assignee: Special Melted Products Limited, Yorkshire, England

[21] Appl. No.: 775,823

[22] Filed: Oct. 15, 1991

[30] Foreign Application Priority Data

Jun. 27, 1991 [GB] United Kingdom ............... 9113828

[51] Int. Cl.$^5$ .................................... H05B 3/60
[52] U.S. Cl. ................................. 373/51; 373/88; 373/92; 219/128
[58] Field of Search ............ 373/51, 42, 52, 54, 373/88, 92; 219/69 E, 119, 120, 145, 146, 128; 29/527.6

[56] References Cited

U.S. PATENT DOCUMENTS

| | | | |
|---|---|---|---|
| 2,532,914 | 12/1950 | Hopkins | 373/51 |
| 3,109,235 | 11/1963 | Harris et al. | 219/128 |
| 3,709,283 | 1/1973 | Paton et al. | 373/51 |
| 3,752,896 | 8/1973 | Zimmermann et al. | 373/51 |
| 4,238,633 | 12/1980 | Medovan et al. | 373/51 |

*Primary Examiner*—Bruce A. Reynolds
*Assistant Examiner*—Tu Hoang
*Attorney, Agent, or Firm*—Kinney & Lange

[57] ABSTRACT

A method of producing a transition joint between components produced from two different grades of ferritic steel comprises the steps of successively re-melting in a vacuum arc furnace a first electrode of one of the required grades of ferritic steel and a second electrode of the required grade of ferritic steel and solidifying the melt as it is progressively formed to produce a single composite component.

1 Claim, 2 Drawing Sheets

PRODUCTION OF TRANSITION JOINTS BETWEEN FERRITIC STEEL COMPONENTS

BACKGROUND OF THE INVENTION

This invention relates to methods of producing transition joints between ferritic steel components and to transition joints so produced.

When joining metal pieces together by welding or fusion, three metallurgical zones are created: a fusion zone; a heat affected zone and an unaffected zone.

The fusion zone presents a cast structure that is only partially refined by successive welding runs and thermal treatments, making inspection of the weld difficult to achieve except by radiography.

The thermal history associated with the welding operation gives rise to an area of coarse grains (called the heat affected zone), lying between the fusion zone and the bulk material. This grain size variation creates an interface which makes the inspection of the weld by ultrasonic methods very difficult resulting in the need to use the inferior and time consuming process of radiography.

Many applications call for the joining of dissimilar materials. For example, in the power generation industry there is a need to join together components produced in varying grades of ferritic steel. Most of the jointing methods employed utilize a transition joint where the difficult weld between the two dissimilar metals is produced in a controlled environment, leaving the two metal fusion welds to be carried out in-situ.

DESCRIPTION OF THE PRIOR ART

Transition joints may be produced using conventional fusion welding processes, either as a direct weld or by utilizing an intermediate material with a composition compatible with both bulk materials. Joints produced by these means, however, in addition to the grain size variation created by use of a localized heat source, contain a sharp variation in chemical composition leading to unwanted metallurgical features such as carbide precipitation and delta ferrite.

Our U.S. Pat. No. 3,109,235 discloses a method of manufacture of a transition piece for joining together by welding or the like two metal pieces or articles of different characteristics, and in particular for joining a metal piece or article of austeritic steel to a metal piece or article of ferritic steel. Transition joints for joining austeritic steel pieces to ferritic steel pieces have been produced commercially following the teaching of U.S. Pat. No. 3,109,235. However, we are aware of no attempt to extend the method to produce transition joints between two ferritic steel pieces of differing compositions.

In certain applications, for example the joining of a steam pipe manufactured in a 9% Cr Mo ferritic alloy to a 2.25% Cr Mo ferritic alloy, a transition joint with an improved level of inspectability and with freedom from rapid changes in chemical and metallurgical composition is required. Such a joint may prove beneficial in safety critical applications giving improved service lifes and inspection.

SUMMARY OF THE INVENTION

The present invention sets out to provide a method of producing transition joints between ferritic steel components which are susceptible to inspection by ultrasonic methods.

According to the present invention in one aspect there is provided a method of producing a transition joint between two ferritic steel pieces of different composition and characteristics, the method comprising the steps of re-melting in immediate succession in an electric arc re-melting furnace first and second electrodes of the required different ferritic steel compositions and solidifying the melt as it is progressively formed.

According to the present invention in another aspect, there is provided a method of producing a transition joint between components produced from two different grades of ferritic steel, the method comprising the steps of successively re-melting in a vacuum arc furnace a first electrode of one of the required grades of ferritic steel and a second electrode of the required grade of ferritic steel and solidifying the melt as it is progressively formed to produce a single composite component.

The electrodes are preferably secured together in end to end relation to form a composite electrode for melting. The electrodes may be welded together manually or may be joined by vacuum arc welding inside a vacuum arc re-melting furnace. The latter is the preferred route as it eliminates a possible source of contamination.

The composite electrode is melted progressively by striking an arc between it and the evacuated crucible and the melt solidified in the water cooled crucible to form a composite product.

In another aspect, the present invention provides a method of producing a transition joint between a first component manufactured from a 9% Cr Mo ferritic alloy and a second component manufactured from a 2.25% Cr Mo ferritic alloy, the method comprising the steps of introducing first and second electrodes of 9% Cr Mo ferritic alloy and 2.25% Cr Mo ferritic alloy into a vacuum arc remelting furnace, vacuum arc welding the two electrodes together in end to end relationship to form a composite electrode, remelting the composite electrode within the vacuum arc furnace and solidifying the melt as it is progressively formed.

According to the present invention in another aspect there is provided a transition joint produced in accordance with a method as described in any one of the preceding five paragraphs.

BRIEF DESCRIPTION OF THE DRAWINGS

The invention will now be described by way of example with reference to the accompanying diagrammatic drawings in which.

DETAILS AND DESCRIPTION OF A PREFERRED EMBODIMENT

Figure 1:
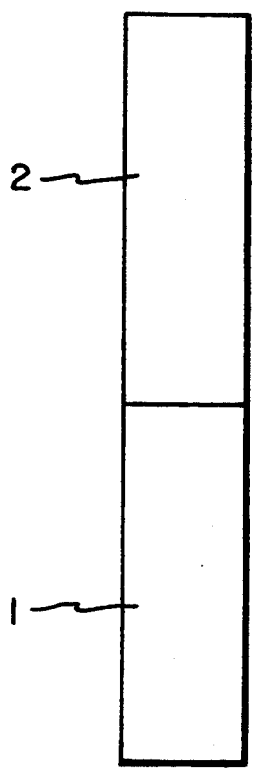
FIG. 1 is a side view of a composite electrode for use in a method in accordance with the invention.

The composite electrode illustrated in FIG. 1 essentially comprises two ferritic steel electrodes 1,2 of differing characteristics joined end-to-end. Preferably, the electrodes are welded together by vacuum arc welding inside a vacuum arc remelting (VAR) furnace. Other methods of joining the electrodes together may, however, be employed. One advantage of vacuum arc welding is that it eliminates a possible source of contamination.

Figure 2:
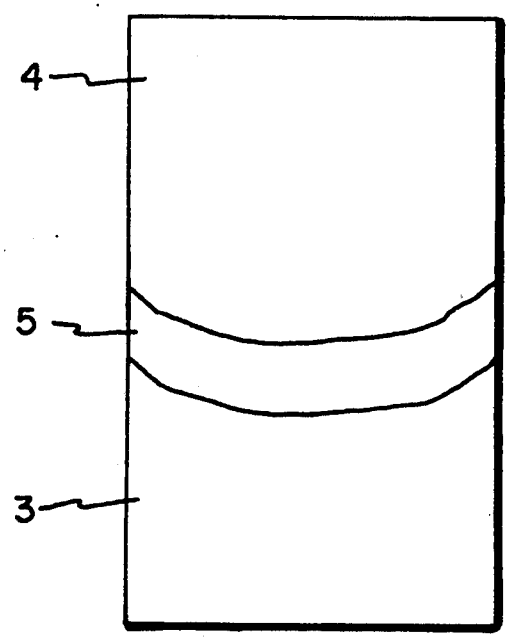
FIG. 2 is a side view of a composite ingot produced from the electrode illustrated in FIG. 1.

FIG. 2 shows the composite ingot produced. Zones 3 and 4 of the ingot having very similar compositions to those of the electrodes 1 and 2 respectively. The ingot also includes a transition zone 5 of intermediate characteristics. The melting currents used are, in general, towards the lower end of the range normally employed for a consumable-electrode process as it is desirable to minimize the depth of the molten pool and hence the width of the transition zone.

Figure 3:
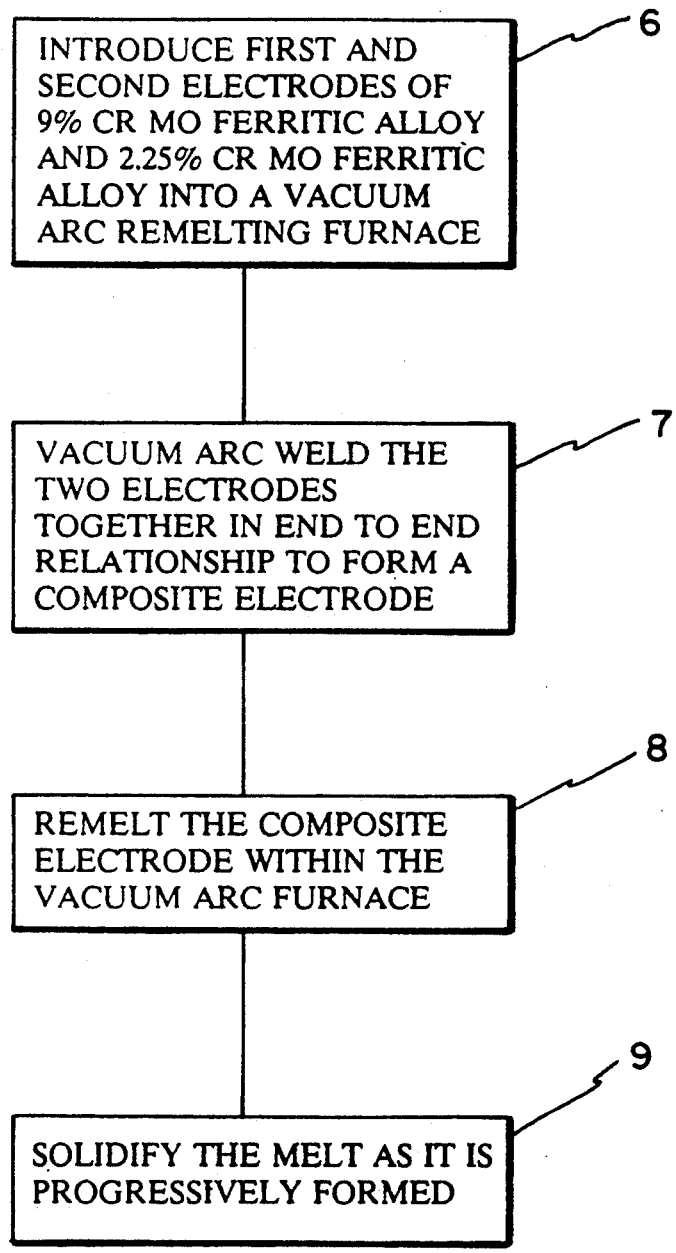
FIG. 3 is a flowchart showing the steps to produce the composite ingot of FIG. 2.

The remelting is preferably carried out in a vacuum arc re-melting furnace (VAR), although an electroslag remelting furnace (ESR) using a suitable slag may also be employed. FIG. 3 shows the steps to produce a composite ingot as shown in FIG. 2, using a first electrode of 9% Cr Mo ferritic alloy and a second electrode of 2.25% Cr Mo ferritic alloy. The steps include introducing the first and second electrode into a remelting furnace (6) welding the electrodes together in end to end relationship to form a composite electrode (7) remelting the composite electrode within the remelting furnace (8) and solidifying the melt as it is progressively formed (9).

It has been found advantageous, for some applications, to forge the transition pieces in order to improve the mechanical properties. Although, any forging operation may be employed, a GFM rotary forging machine is preferred in order to maintain the geometry of the transition zone.

In general, most ferritic heat resisting steels may be joined by transition joints in the manner described above. As a particular example, a transition piece of 406 mm diameter was made from a composite electrode of ASME SA-335 P91 and P22 materials melted in a vacuum arc remelting furnace. The composite ingot was forged to 260 mm diameter using a GFM SXP65 rotary forging machine. A transition joint of 240 mm outside diameter and 114 mm inside diameter was produced from the composite billet.

Nominal compositions of typical ferritic steels which may be employed in methods in accordance with the invention are presented in Table 1 below.

TABLE 1

EXAMPLES OF SUITABLE FERRITIC STEELS

| Weight % | ASME SA335 P22 | ASME SA335 P91 |
|---|---|---|
| C | 0.15 max | 0.08/0.12 |
| Mn | 0.30/0.60 | 0.30/0.60 |
| P | 0.030 max | 0.020 max |
| S | 0.030 max | 0.010 max |
| Si | 0.50 max | 0.20/0.50 |
| Ni | — | 0.40 max |
| Cr | 1.90/2.60 | 8.00/9.50 |
| Mo | 0.87/1.13 | 0.85/1.05 |
| V | — | 0.18/0.25 |
| Nb | — | 0.06/0.10 |
| Sol. Al. | — | 0.04 max |
| N | — | 0.030/0.070 |

It will be understood that the foregoing is exemplary of methods of producing transition joints between ferritic steel components in accordance with the invention and that modifications can readily be made thereto without departing from the true scope of the invention as set out in the appended claims.

I claim:

1. A method of producing a transition joint between a first component manufactured from a 9% Cr Mo ferritic alloy and a second component manufactured from a 2.25% Cr Mo ferritic alloy, the method comprising the steps of introducing first and second electrodes of 9% Cr Mo ferritic alloy and 2.25% Cr Mo ferritic alloy into a vacuum arc remelting furnace, vacuum arc welding the electrodes together in end to end relationship to form a composite electrode, remelting the composite electrode with the vacuum arc remelting furnace to produce a melt and solidifying the melt as it is progressively formed.

* * * * *